United States Patent [19]

Molloy

[11] Patent Number: 5,950,529
[45] Date of Patent: Sep. 14, 1999

[54] VEGETABLE PEELING DEVICE

[76] Inventor: Lloyd T. Molloy, 5730 Blossom View Ave., Las Vegas, Nev. 89122

[21] Appl. No.: 09/234,669

[22] Filed: Jan. 21, 1999

[51] Int. Cl.$^6$ ............................. A23N 7/00; A23N 7/02
[52] U.S. Cl. ............................. 99/633; 99/516; 99/536; 99/629; 99/631
[58] Field of Search ................. 99/584, 623, 629–634, 99/516, 536; 366/314; 241/199.12, 282.1

[56] References Cited

U.S. PATENT DOCUMENTS

| 880,022 | 2/1908 | Halbach | 99/631 |
|---|---|---|---|
| 2,299,020 | 10/1942 | Jones | 366/314 X |
| 2,626,645 | 1/1953 | Hubman | 99/62.3 |
| 2,748,819 | 6/1956 | Mayer | 99/631 |
| 2,866,487 | 12/1958 | Clsen | 99/623 X |
| 2,953,608 | 9/1960 | Isola | 99/536 |
| 3,009,658 | 11/1961 | Resk | 9/516 X |
| 5,065,672 | 11/1991 | Federighi, Sr. | 99/631 |

*Primary Examiner*—Timothy F. Simone

[57] ABSTRACT

A vegetable peeling device for peeling vegetables. The vegetable peeling device includes a housing has a lower base portion, a gear housing portion, and a drum portion. The drum portion of the housing has an inner surface defining a reservoir. The drum portion of the housing has a top opening into the reservoir of the drum portion and a bottom opening providing a passage between the reservoir of the drum portion and the lower base portion of the housing. The drum portion has a tubular inlet spout into the reservoir. A spinning plate is rotatably mounted in the lower base portion of the housing adjacent the bottom opening of the drum portion of the housing. The spinning plate has an elongate bumper ridge upwardly extending therefrom. The inner surface of the drum portion of the housing comprising an abrasive surface.

11 Claims, 3 Drawing Sheets

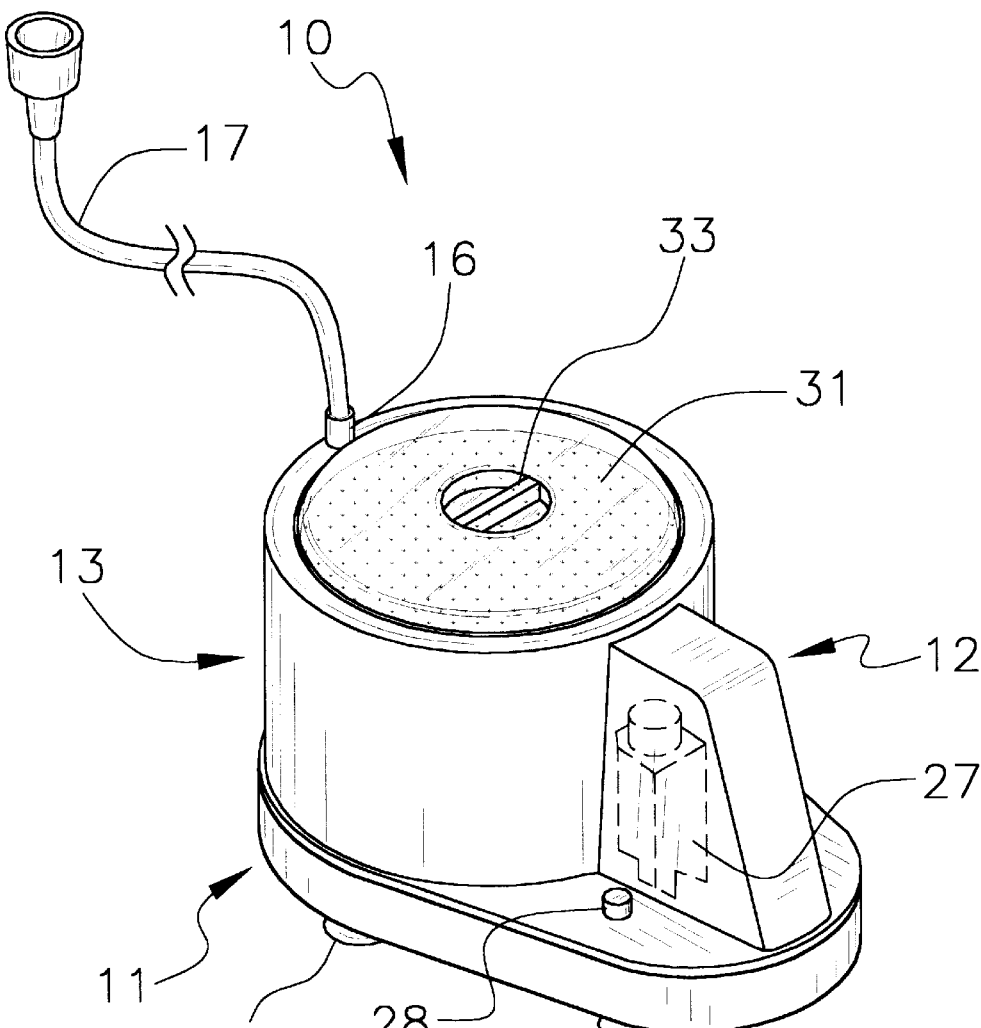
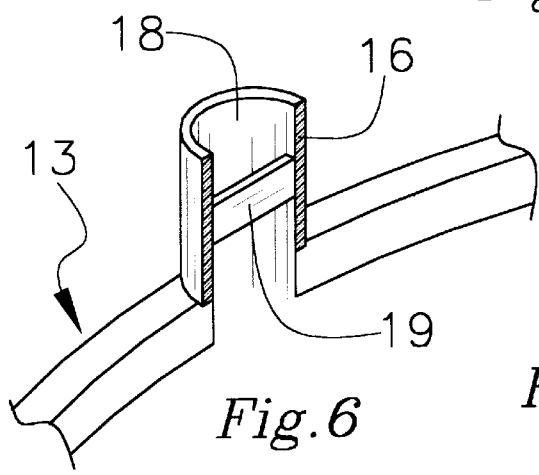
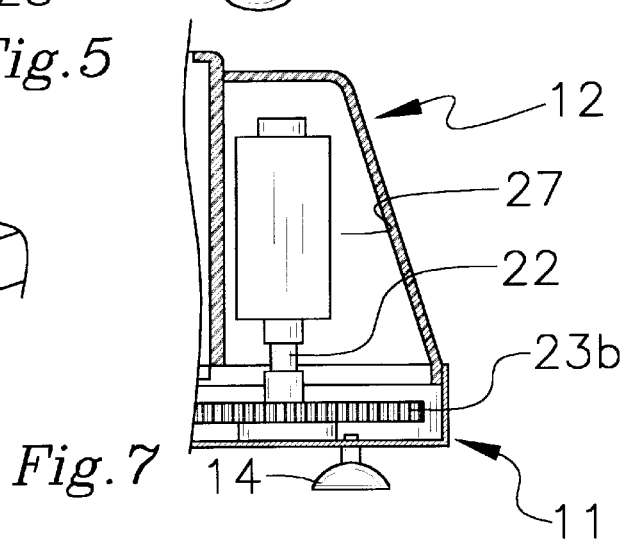

VEGETABLE PEELING DEVICE

BACKGROUND OF THE INVENTION

1. Field of the Invention

The present invention relates to vegetable peeling devices and more particularly pertains to a new vegetable peeling device for peeling vegetables.

2. Description of the Prior Art

The use of vegetable peeling devices is known in the prior art. More specifically, vegetable peeling devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,550,656 by Kirk; U.S. Pat. No. 3,602,280 by Hill et al.; U.S. Pat. No. Des. 328,692 by Holcomb; U.S. Pat. No. 4,211,002 by Kirk; U.S. Pat. No. 3,026,612 by Szczepanski; and U.S. Pat. No. 5,106,641 by Bichel.

While these devices fulfill their respective, particular objectives and requirements, the aforementioned patents do not disclose a new vegetable peeling device. The inventive device includes a housing has a lower base portion, a gear housing portion, and a drum portion. The drum portion of the housing has an inner surface defining a reservoir. The drum portion of the housing has a top opening into the reservoir of the drum portion and a bottom opening providing a passage between the reservoir of the drum portion and the lower base portion of the housing. The drum portion has a tubular inlet spout into the reservoir. A spinning plate is rotatably mounted in the lower base portion of the housing adjacent the bottom opening of the drum portion of the housing. The spinning plate has an elongate bumper ridge upwardly extending therefrom. The inner surface of the drum portion of the housing comprising an abrasive surface.

In these respects, the vegetable peeling device according to the present invention substantially departs from the conventional concepts and designs of the prior art, and in so doing provides an apparatus primarily developed for the purpose of peeling vegetables.

SUMMARY OF THE INVENTION

In view of the foregoing disadvantages inherent in the known types of vegetable peeling devices now present in the prior art, the present invention provides a new vegetable peeling device construction wherein the same can be utilized for peeling vegetables.

The general purpose of the present invention, which will be described subsequently in greater detail, is to provide a new vegetable peeling device apparatus and method which has many of the advantages of the vegetable peeling devices mentioned heretofore and many novel features that result in a new vegetable peeling device which is not anticipated, rendered obvious, suggested, or even implied by any of the prior art vegetable peeling devices, either alone or in any combination thereof.

To attain this, the present invention generally comprises a housing has a lower base portion, a gear housing portion, and a drum portion. The drum portion of the housing has an inner surface defining a reservoir. The drum portion of the housing has a top opening into the reservoir of the drum portion and a bottom opening providing a passage between the reservoir of the drum portion and the lower base portion of the housing. The drum portion has a tubular inlet spout into the reservoir. A spinning plate is rotatably mounted in the lower base portion of the housing adjacent the bottom opening of the drum portion of the housing. The spinning plate has an elongate bumper ridge upwardly extending therefrom. The inner surface of the drum portion of the housing comprising an abrasive surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vegetable peeling device apparatus and method which has many of the advantages of the vegetable peeling devices mentioned heretofore and many novel features that result in a new vegetable peeling device which is not anticipated, rendered obvious, suggested, or even implied by any of the prior art vegetable peeling devices, either alone or in any combination thereof.

It is another object of the present invention to provide a new vegetable peeling device which may be easily and efficiently manufactured and marketed.

It is a further object of the present invention to provide a new vegetable peeling device which is of a durable and reliable construction.

An even further object of the present invention is to provide a new vegetable peeling device which is susceptible of a low cost of manufacture with regard to both materials and labor, and which accordingly is then susceptible of low prices of sale to the consuming public, thereby making such vegetable peeling device economically available to the buying public.

Still yet another object of the present invention is to provide a new vegetable peeling device which provides in the apparatuses and methods of the prior art some of the advantages thereof, while simultaneously overcoming some of the disadvantages normally associated therewith.

Still another object of the present invention is to provide a new vegetable peeling device for peeling vegetables.

Yet another object of the present invention is to provide a new vegetable peeling device which includes a housing has a lower base portion, a gear housing portion, and a drum portion. The drum portion of the housing has an inner surface defining a reservoir. The drum portion of the housing has a top opening into the reservoir of the drum portion and a bottom opening providing a passage between the reservoir of the drum portion and the lower base portion of the housing. The drum portion has a tubular inlet spout into the reservoir. A spinning plate is rotatably mounted in the lower base portion of the housing adjacent the bottom opening of the drum portion of the housing. The spinning plate has an elongate bumper ridge upwardly extending therefrom. The inner surface of the drum portion of the housing comprising an abrasive surface.

Still yet another object of the present invention is to provide a new vegetable peeling device that removes the skin of potatoes and carrots with less of the flesh of the vegetable being peeled off with the skin than when peeled with traditional vegetable peelers.

Even still another object of the present invention is to provide a new vegetable peeling device that uses a flow of water to help drain the peelings out of the device and leave clean peeled vegetables in the device ready to be used for cooking.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a schematic perspective view of a preferred motorized embodiment of the present invention.

FIG. 6 is a schematic cross sectional view of the inlet spout to illustrate the spray divider therein.

FIG. 7 is a schematic partial cross sectional view looking into the gear housing portion of the motorized embodiment of the present invention.

DESCRIPTION OF THE PREFERRED EMBODIMENT

Figure 1:
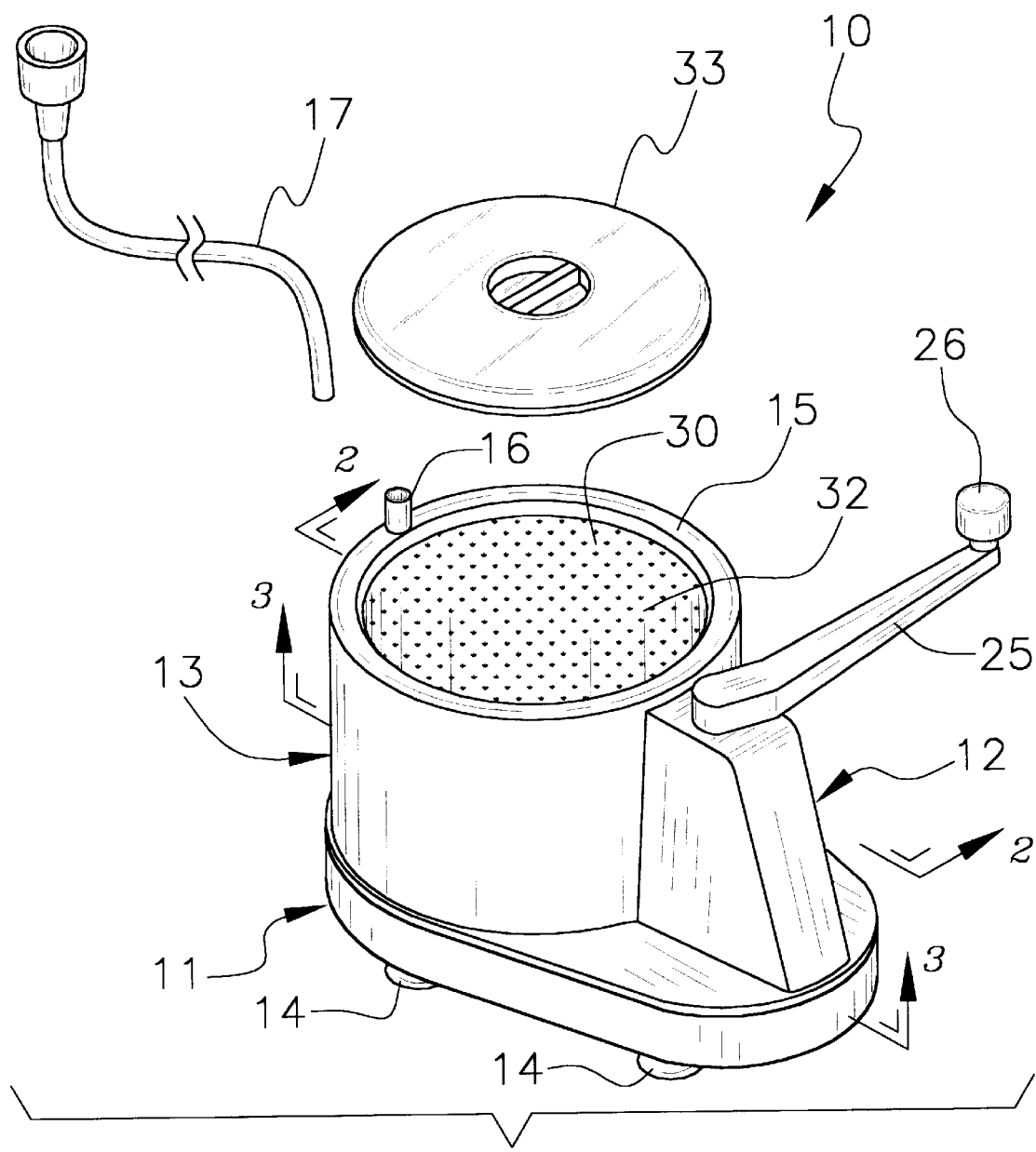
FIG. 1 is a schematic exploded perspective view of a manual embodiment vegetable peeling device according to the present invention.

With reference now to the drawings, and in particular to FIGS. 1 through 7 thereof, a new vegetable peeling device embodying the principles and concepts of the present invention and generally designated by the reference numeral 10 will be described.

As best illustrated in FIGS. 1 through 7, the vegetable peeling device 10 generally comprises a housing has a lower base portion, a gear housing portion, and a drum portion. The drum portion of the housing has an inner surface defining a reservoir. The drum portion of the housing has a top opening into the reservoir of the drum portion and a bottom opening providing a passage between the reservoir of the drum portion and the lower base portion of the housing. The drum portion has a tubular inlet spout into the reservoir. A spinning plate is rotatably mounted in the lower base portion of the housing adjacent the bottom opening of the drum portion of the housing. The spinning plate has an elongate bumper ridge upwardly extending therefrom. The inner surface of the drum portion of the housing comprising an abrasive surface.

In closer detail, the device 10 comprises a housing has a lower base portion 11, a gear housing portion 12 upwardly extending from lower base portion, and a generally cylindrical drum portion 13 upwardly extending from the lower base portion adjacent the gear housing portion. The lower base portion of the housing is adapted for resting on a resting surface such as a kitchen countertop adjacent a sink in the kitchen countertop. Preferably, the lower base portion of the housing has a plurality of downwardly depending feet each comprising a suction cup 14 adapted for suctionally coupling the lower base portion to the resting surface.

Figure 2:
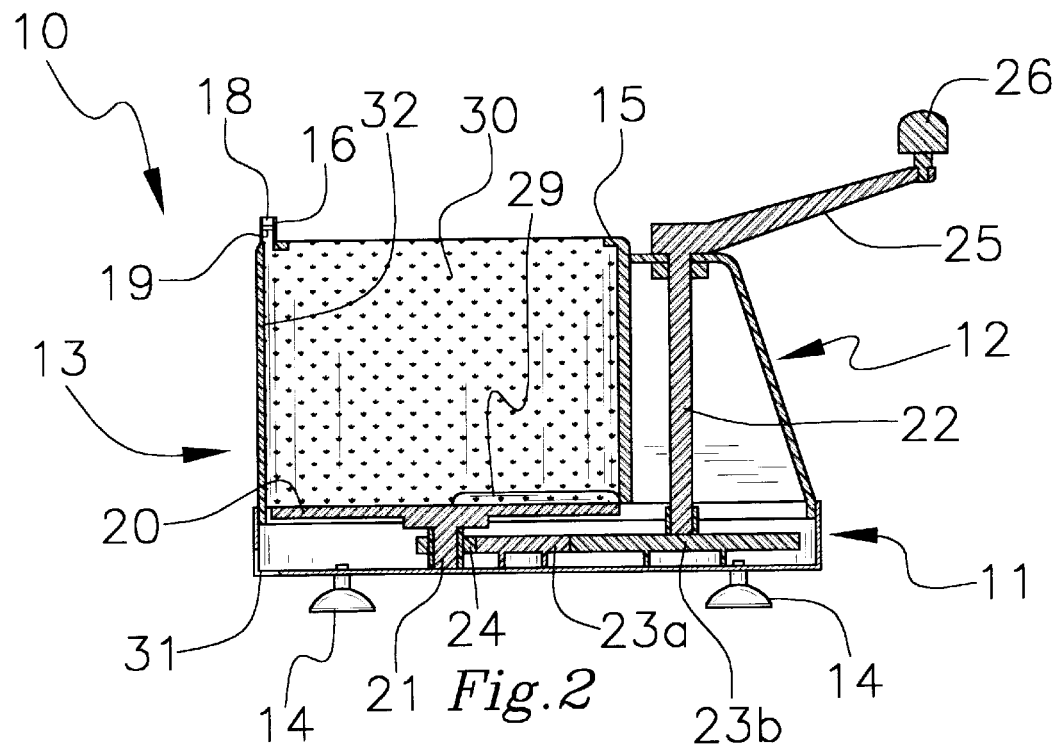
FIG. 2 is a schematic cross sectional view taken from line 2—2 of FIG. 1.

The drum portion of the housing has a generally cylindrical inner surface 32 defining a reservoir adapted for holding vegetables therein. As best illustrated in FIG. 2, the drum portion of the housing has a generally circular upper edge defining a top opening into the reservoir of the drum portion. The drum portion of the housing has a generally circular bottom opening providing a passage between the reservoir of the drum portion and the lower base portion of the housing. Preferably, the drum portion of the housing has a generally circular inwardly radiating lip 15 adjacent the upper edge of the drum portion.

The drum portion has a generally cylindrical tubular inlet spout 16 into the reservoir adjacent the upper edge of the drum portion. The inlet spout is upwardly extended from the lip of the drum portion. The inlet spout is adapted for fluidly connecting to a water supply. As illustrated in FIG. 1, preferably, a flexible hose 17 is provided having a pair of opposite open ends. One of the ends of the hose is inserted into the inlet spout to fluidly connect the flexible hose to the inlet spout. The other of the ends of the flexible hose is adapted for fluidly connecting to a water faucet to fluidly connection the flexible hose to a water supply.

As best illustrated in FIG. 6, the inlet spout has a lumen 18 and an elongate spray divider 19 extending across the lumen at a general midpoint of the height of the inlet spout. In use, the spray divider splits the flow of water through the inlet spout in two different directions into the reservoir to help ensure that water flows over a larger area of the reservoir than without the spray divider.

A disk-shaped spinning plate 20 is provided having a downwardly extending lower axle 21 rotatably mounted in the lower base portion of the housing adjacent the bottom opening of the drum portion of the housing to permit rotation of the spinning plate about the lower axle.

Figure 3:
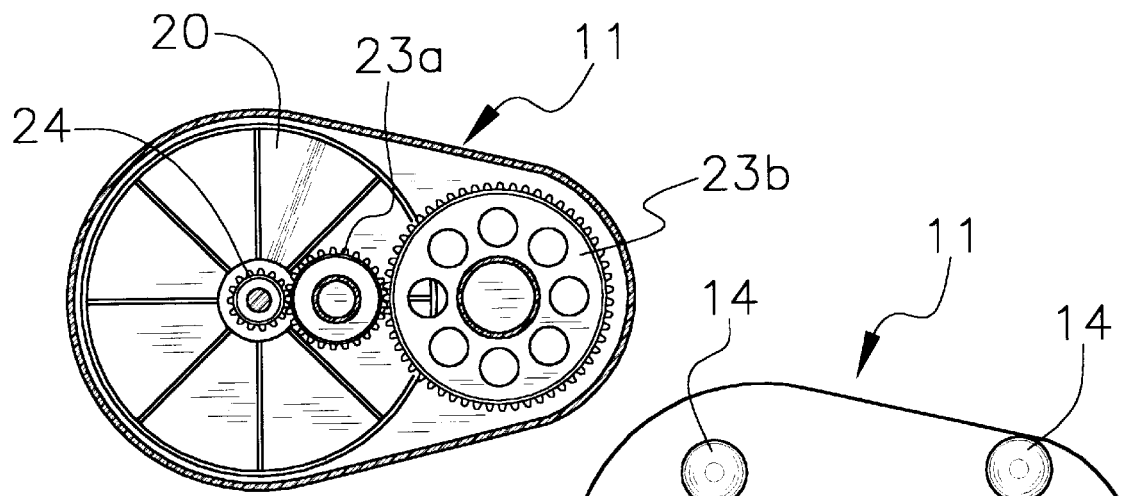
FIG. 3 is a schematic cross sectional view illustrating the set of gears taken from line 3—3 of FIG. 1.
Figure 4:
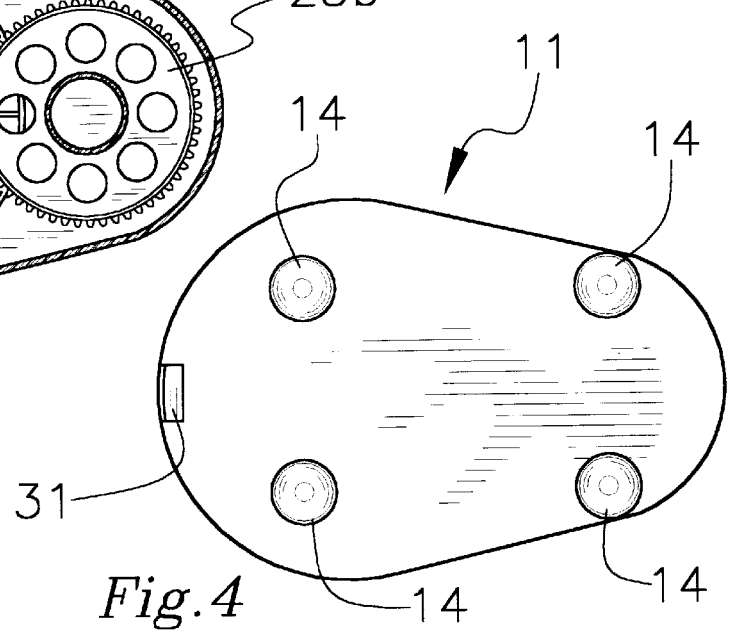
FIG. 4 is a schematic bottom view of the present invention.

A rotating shaft 22 is rotatably mounted in the gear housing portion of the housing, the rotating shaft has a pair of opposite ends. As best illustrated in FIG. 3, a set of interconnected gears 23a,23b connect a first of the ends of the rotating shaft to a drive gear 24 on the lower axle of the spinning plate such that rotation of the rotating shaft in turn rotates the spinning plate via the set of gears.

In one embodiment of the device, as illustrated in FIG. 2, a second of the ends of the rotating shaft is outwardly extended through the gear housing portion of the housing. In this embodiment, a crank 25 is coupled to the second end of the rotating shaft for rotating the rotating shaft. Preferably, the crank has a turn handle 26 rotatably coupled thereto.

FIGS. 5 and 7 illustrate a preferred embodiment of the device where a motor 27 is provided in the gear housing portion of the housing with the rotating shaft extended into the motor such that the motor rotating the rotating shaft. In one idea embodiment of this preferred embodiment, the motor is electrically connected by a power cord extending from the housing to a power supply. In another ideal embodiment of this preferred embodiment, the motor is electrically connected to a battery power supply in the housing. As illustrated in FIG. 5, preferably, a switch 28 is mounted to the housing and electrically connected to the motor for selectively activating the motor to rotate the rotating shaft.

As illustrated in FIG. 2, the spinning plate has an generally circular upper face, a center, and a generally circular outer perimeter. The spinning plate also has an elongate bumper ridge 29 upwardly extending from the upper face of the spinning plate along a radius of the spinning plate extending between the center and outer perimeter of the spinning plate. The bumper ridge has an outer end adjacent the outer perimeter of the spinning plate that is preferably positioned adjacent the inner surface of the drum portion. In use, rotation of the spinning plate rotates the bumper ridge about the axis of rotation to agitate and aid tumbling of vegetables in the reservoir of the drum portion.

The inner surface of the drum portion of the housing comprises an abrasive or roughened surface 30 (such as a sandpaper surface or a plurality of pyramids inwardly extending from the inner surface into the reservoir) adapted for removing a skin of a vegetable in the reservoir as the vegetable rotating in the reservoir comes into contact with the abrasive surface.

The lower base portion of the housing has an drain outlet 31 adjacent the drum portion of the housing to permit flow of waste water and peelings out the reservoir so that only the peeled vegetable remain in the reservoir.

Preferably, a lid 33 substantially covers the top opening of the drum portion into the reservoir to prevent vegetables, peelings and water from spilling or spraying out of the top opening of the drum portion.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for peeling vegetable, comprising:
   a housing having a lower base portion, a gear housing portion, and a drum portion;
   said drum portion of said housing having an inner surface defining a reservoir;
   said drum portion of said housing having a top opening into said reservoir of said drum portion and a bottom opening providing a passage between said reservoir of said drum portion and said lower base portion of said housing;
   said drum portion having a tubular inlet spout into said reservoir;
   a spinning plate being rotatably mounted in said lower base portion of said housing adjacent said bottom opening of said drum portion of said housing;
   said spinning plate having an elongate bumper ridge upwardly extending therefrom; and
   said inner surface of said drum portion of said housing comprising an abrasive surface.

2. The device of claim 1, wherein said lower base portion of said housing has a plurality of downwardly depending feet.

3. The device of claim 2, wherein each foot comprises a suction cup.

4. The device of claim 1, wherein said inlet spout has a lumen and an elongate spray divider extending across said lumen.

5. The device of claim 1, wherein said spinning plate has a downwardly extending lower axle rotatably mounted in said lower base portion of said housing.

6. The device of claim 1, further comprising a rotating shaft being rotatably mounted in said gear housing portion of said housing, said rotating shaft having a pair of opposite ends, a set of interconnected gears connecting a first of said ends of said rotating shaft to said spinning plate such that rotation of said rotating shaft rotates said spinning plate via said set of gears.

7. The device of claim 6, wherein a second of said ends of said rotating shaft is outwardly extended through said gear housing portion of said housing, and wherein a crank is coupled to said second end of said rotating shaft.

8. The device of claim 6, wherein a motor is provided in said gear housing portion of said housing, said motor rotating said rotating shaft.

9. The device of claim 1, wherein said lower base portion of said housing has an drain outlet adjacent said drum portion of said housing.

10. A device for peeling vegetable, comprising:
   a housing having a lower base portion, a gear housing portion upwardly extending from lower base portion, and a generally cylindrical drum portion upwardly extending from said lower base portion adjacent said gear housing portion;
   said lower base portion of said housing being adapted for resting on a resting surface;
   said lower base portion of said housing having a plurality of downwardly depending feet each comprising a suction cup adapted for suctionally coupling said lower base portion to the resting surface;
   said drum portion of said housing having a generally cylindrical inner surface defining a reservoir adapted for holding vegetables therein;

said drum portion of said housing having a generally circular upper edge defining a top opening into said reservoir of said drum portion;

said drum portion of said housing having a generally circular bottom opening providing a passage between said reservoir of said drum portion and said lower base portion of said housing;

said drum portion of said housing having a generally circular inwardly radiating lip adjacent said upper edge of said drum portion;

said drum portion having a generally cylindrical tubular inlet spout into said reservoir adjacent said upper edge of said drum portion, said inlet spout being upwardly extended from said lip of said drum portion;

an inlet spout being adapted for fluidly connecting to a water supply, wherein a flexible hose is provided having a pair of opposite open ends, one of said ends of said hose being inserted into said inlet spout to fluidly connect said flexible hose to said inlet spout, the other of said ends of said flexible hose being adapted for fluidly connection said flexible hose to a water supply;

said inlet spout having a lumen and an elongate spray divider extending across said lumen;

a disk-shaped spinning plate having a downwardly extending lower axle rotatably mounted in said lower base portion of said housing adjacent said bottom opening of said drum portion of said housing to permit rotation of said spinning plate about said lower axle;

a rotating shaft being rotatably mounted in said gear housing portion of said housing, said rotating shaft having a pair of opposite ends;

a set of interconnected gears connecting a first of said ends of said rotating shaft to said lower axle of said spinning plate such that rotation of said rotating shaft rotates said spinning plate via said set of gears;

a second of said ends of said rotating shaft being outwardly extended through said gear housing portion of said housing;

a crank being coupled to said second end of said rotating shaft;

said spinning plate having an generally circular upper face, a center, and a generally circular outer perimeter;

said spinning plate having an elongate bumper ridge upwardly extending from said upper face of said spinning plate along a radius of said spinning plate extending between said center and outer perimeter of said spinning plate;

said bumper ridge having an outer end adjacent said outer perimeter of said spinning plate, said outer end of said bumper ridge being positioned adjacent said inner surface of said drum portion;

said inner surface of said drum portion of said housing comprising an abrasive surface; and said lower base portion of said housing having an drain outlet adjacent said drum portion of said housing.

11. A device for peeling vegetable, comprising:

a housing having a lower base portion, a gear housing portion upwardly extending from lower base portion, and a generally cylindrical drum portion upwardly extending from said lower base portion adjacent said gear housing portion;

said lower base portion of said housing being adapted for resting on a resting surface;

said lower base portion of said housing having a plurality of downwardly depending feet each comprising a suction cup adapted for suctionally coupling said lower base portion to the resting surface;

said drum portion of said housing having a generally cylindrical inner surface defining a reservoir adapted for holding vegetables therein;

said drum portion of said housing having a generally circular upper edge defining a top opening into said reservoir of said drum portion;

said drum portion of said housing having a generally circular bottom opening providing a passage between said reservoir of said drum portion and said lower base portion of said housing;

said drum portion of said housing having a generally circular inwardly radiating lip adjacent said upper edge of said drum portion;

said drum portion having a generally cylindrical tubular inlet spout into said reservoir adjacent said upper edge of said drum portion, said inlet spout being upwardly extended from said lip of said drum portion;

an inlet spout being adapted for fluidly connecting to a water supply, wherein a flexible hose is provided having a pair of opposite open ends, one of said ends of said hose being inserted into said inlet spout to fluidly connect said flexible hose to said inlet spout, the other of said ends of said flexible hose being adapted for fluidly connection said flexible hose to a water supply;

said inlet spout having a lumen and an elongate spray divider extending across said lumen;

a disk-shaped spinning plate having a downwardly extending lower axle rotatably mounted in said lower base portion of said housing adjacent said bottom opening of said drum portion of said housing to permit rotation of said spinning plate about said lower axle;

a rotating shaft being rotatably mounted in said gear housing portion of said housing, said rotating shaft having a pair of opposite ends;

a set of interconnected gears connecting a first of said ends of said rotating shaft to said lower axle of said spinning plate such that rotation of said rotating shaft rotates said spinning plate via said set of gears;

a second of said ends of said rotating shaft being outwardly extended through said gear housing portion of said housing;

a motor being provided in said gear housing portion of said housing, said motor rotating said rotating shaft;

said spinning plate having an generally circular upper face, a center, and a generally circular outer perimeter;

said spinning plate having an elongate bumper ridge upwardly extending from said upper face of said spinning plate along a radius of said spinning plate extending between said center and outer perimeter of said spinning plate;

said bumper ridge having an outer end adjacent said outer perimeter of said spinning plate, said outer end of said bumper ridge being positioned adjacent said inner surface of said drum portion;

said inner surface of said drum portion of said housing comprising an abrasive surface; and said lower base portion of said housing having an drain outlet adjacent said drum portion of said housing.

* * * * *